United States Patent
Tracy et al.

[15] 3,703,653
[45] Nov. 21, 1972

[54] RECIPROCATING MOTOR WITH MOTION CONVERSION MEANS

[72] Inventors: Robert D. Tracy, 1506 West Chicago Avenue, South Milwaukee, Wis. 53172; David J. Derouin, 12045 West St. Martin Road, Franklin, Wis. 53132

[22] Filed: June 9, 1971

[21] Appl. No.: 151,462

[52] U.S. Cl. .....................310/24, 310/35, 310/103
[51] Int. Cl. ..............................................H02k 7/06
[58] Field of Search........310/22, 23, 24, 103, 34, 35, 310/190

[56] References Cited

UNITED STATES PATENTS

| | | | |
|---|---|---|---|
| 3,636,391 | 1/1972 | Horner et al. | 310/24 |
| 3,328,656 | 6/1967 | Dotson | 310/24 X |
| 1,349,100 | 8/1920 | Reynolds et al. | 310/24 |
| 1,724,446 | 8/1929 | Worthington | 310/190 UX |

*Primary Examiner*—D. F. Duggan
*Attorney*—James E. Nilles

[57] ABSTRACT

A permanent magnet motor which utilizes pairs of permanent magnets as the power source for the motor. The magnets of each pair are arranged with their like poles adjacent one another so that normally the magnets of the pairs oppose or repel one another. Shiftable means are provided for being inserted between the magnets of each pair so as to then to alter the magnetic field between the magnets to cause the magnets to move toward one another with considerable force. One magnet of each pair is connected to a common drive shaft member. The shiftable means for being inserted between and withdrawn from the magnets of each pair are shifted by any suitable means in timed relationship with one another.

6 Claims, 28 Drawing Figures

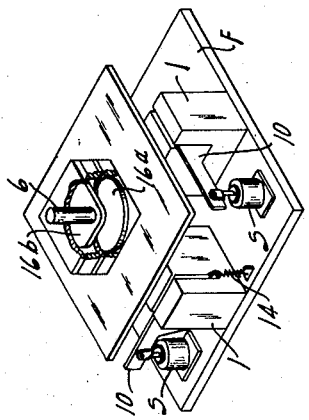
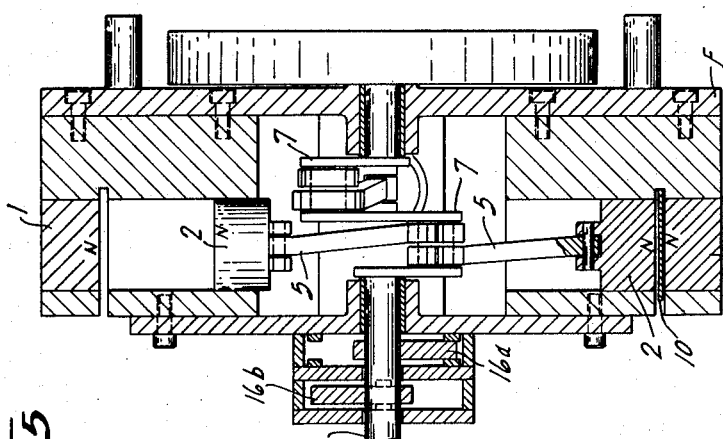
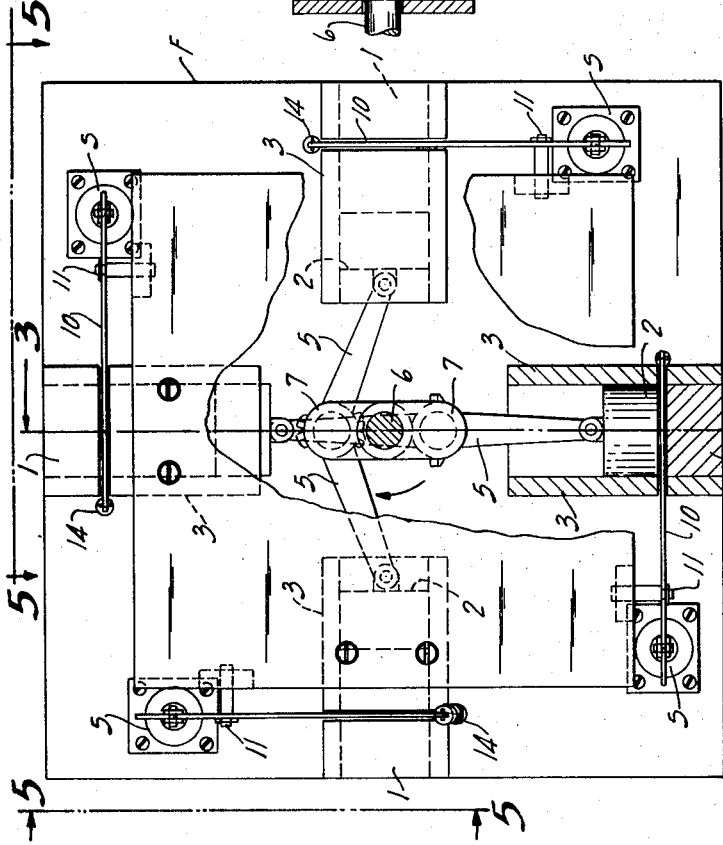
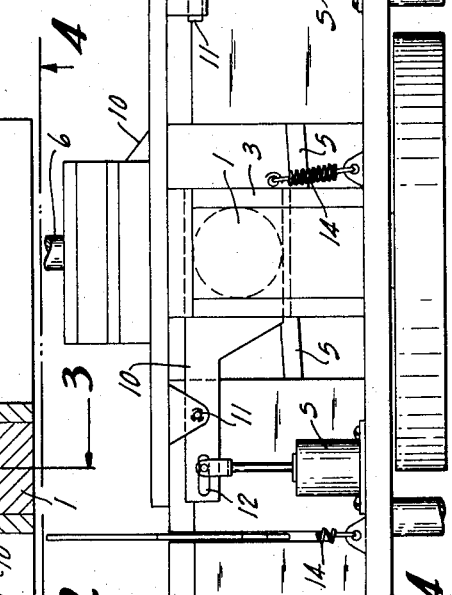
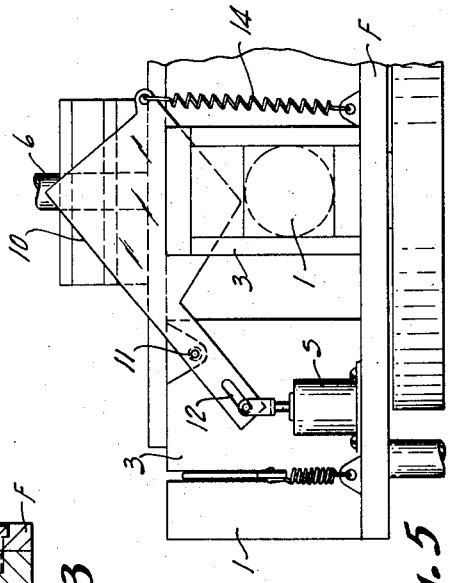
INVENTORS
ROBERT D. TRACY
DAVID J. DEROUIN
BY: *James E. Miller*
ATTORNEY

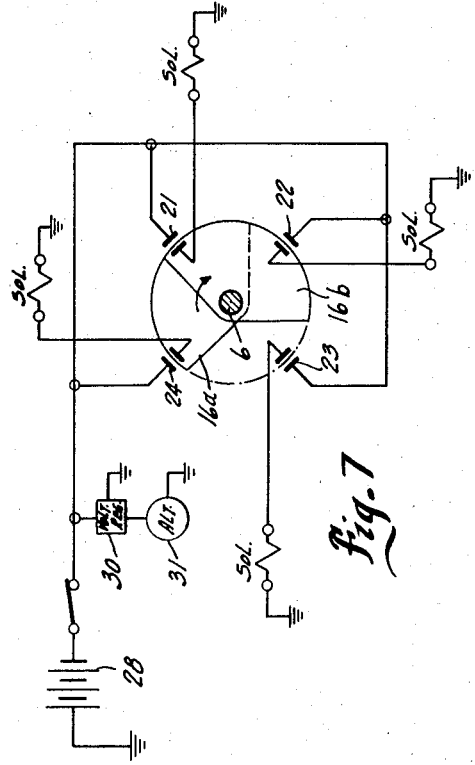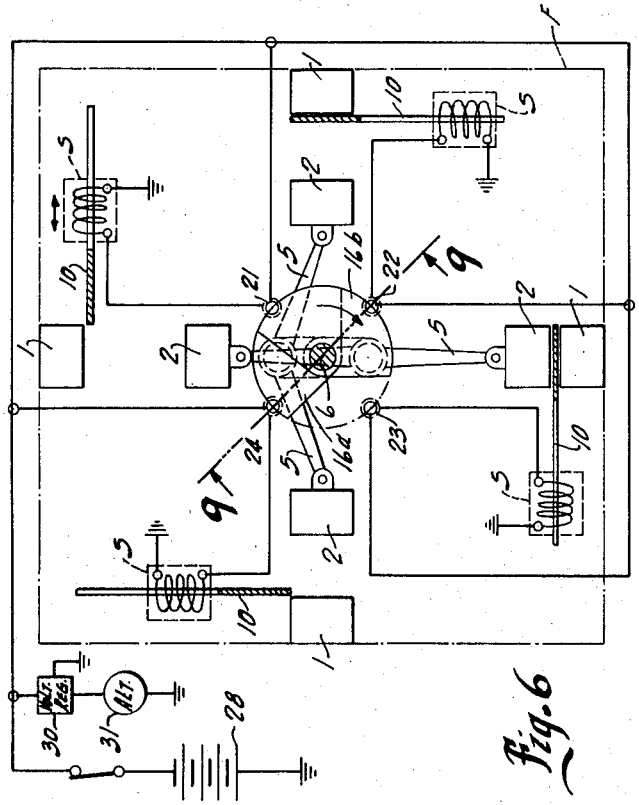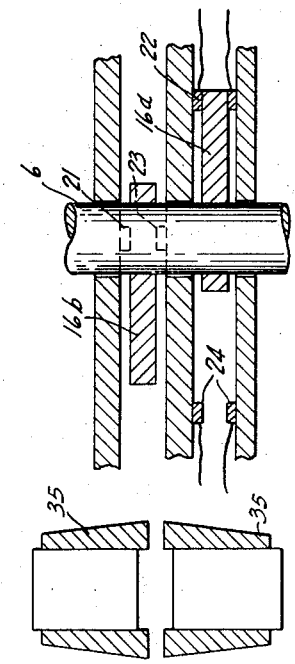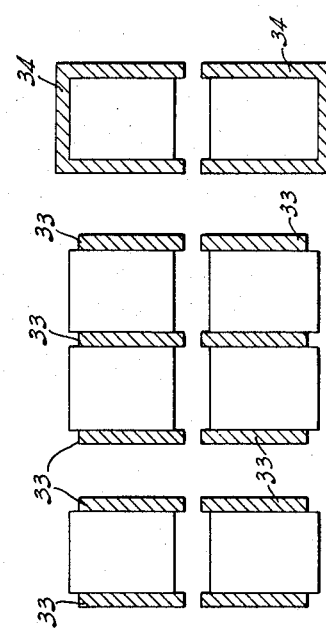

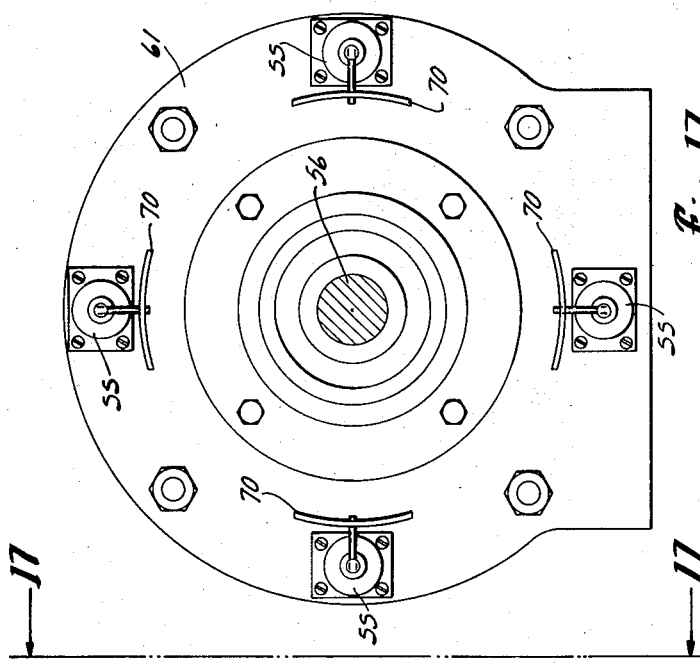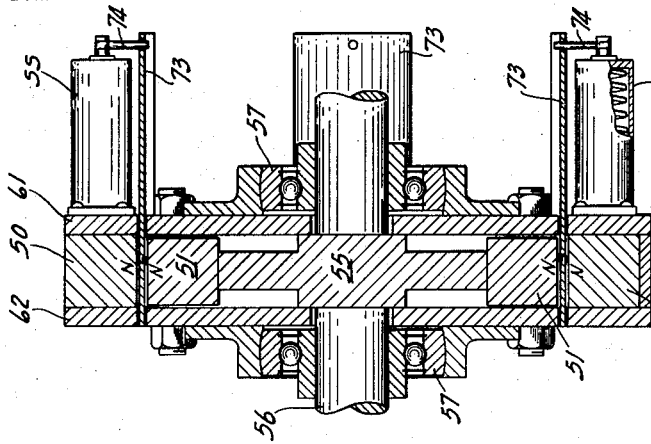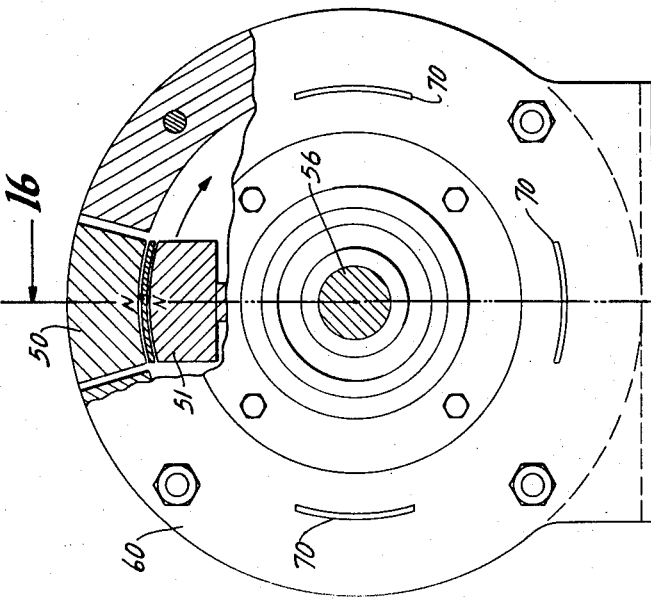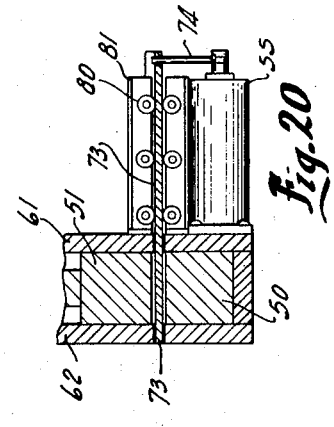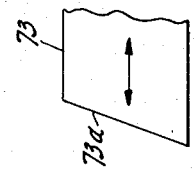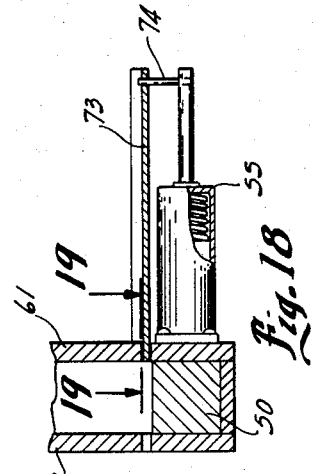

INVENTORS:
ROBERT D. TRACY
BY: DAVID J. DEROUIN

James E. Nilles
ATTORNEY

RECIPROCATING MOTOR WITH MOTION CONVERSION MEANS

BACKGROUND OF THE INVENTION

The invention pertains to electric motors of the dynamo-electro type which employ permanent magnets as their source of power. The motor of the present invention can be of either the reciprocating or rotary type. An example of a prior art device of only generally similar character is shown in the U.S. Pat. No. 3,331,973 issued July 18, 1967 to McClure and entitled "Magnetic Motor". In that motor, electro magnets were moved between two permanent magnets, the two permanent magnets being stationary and placed in an attract state. The electro-magnet changed current and it was necessary to employ continuous electrical current for causing this change of current.

SUMMARY OF THE INVENTION

The present invention provides a dynamo-electro motor which employs pairs of permanent magnets which are normally placed in a repel state. Shiftable means are provided for shifting between the magnets of each pair to thereby cause the flux lines therebetween to be altered and thereby resulting in at least one of the magnets moving toward the other. This shiftable means is alternately inserted between and withdrawn from the magnets of both pairs to thereby continually cause the magnets of each pair to alternately move away and toward one another. One of the permanent magnets of each pair are connected to a common drive shaft whereby the force between the pairs of magnets all contribute in timed relationship with one another to furnish driving power to the shaft.

In one specific form of a motor of the above type, the shifting means is a steel plate which is shifted by a electrically actuated solenoid, the solenoids in turn are operated in timed relationship with one another by a distributor rotor connected to the drive shaft. A source of electrical current such as a battery acts to operate the solenoids in timed relationship with one another through the distributor rotor.

A more limited aspect of the present invention is to provide a permanent magnet motor of the above type in which the shiftable means for being inserted between and withdrawn from the permanent magnets is mounted on anti-friction means so as to reduce the force required to withdraw and insert the shiftable means.

In one specific aspect of the invention, the permanent magnet motor above described is of the reciprocating type wherein a plurality of magnets are connected by pivoted arms to a common crankshaft.

Another more specific aspect of the invention relates to a permanent magnet motor in which one magnet of each of several pairs of magnets are connected to a common rotary member, and which pairs of magnets all act simultaneously to apply the driving force to a common drive shaft.

These and other objects and advantages of the present invention will appear hereinafter as this disclosure progresses, reference being had to the accompanying drawings.

BRIEF DESCRIPTION OF THE DRAWINGS

RECIPROCATING MAGNET TYPE

Figure 22:
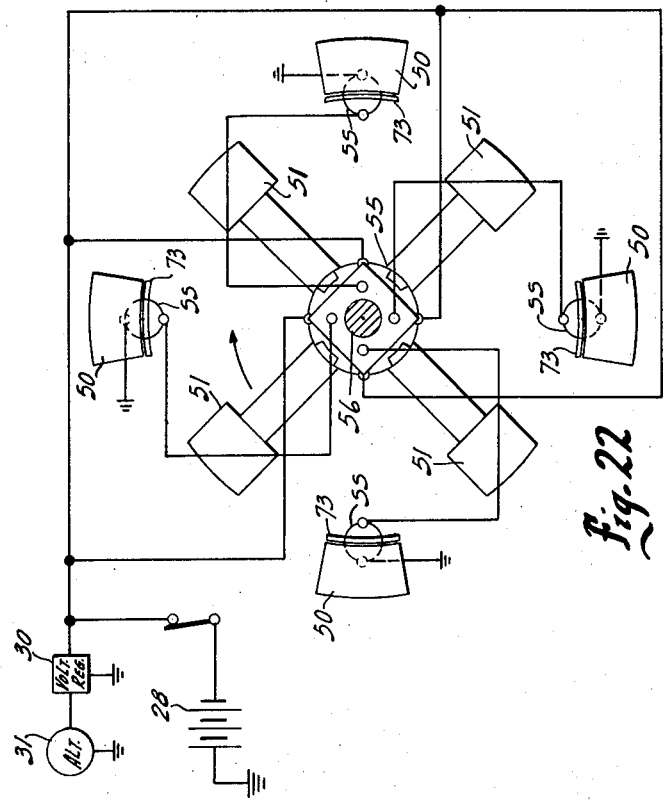

FIG. 1 is a small, perspective view of one form of the invention and shows a motor of the reciprocating magnet type;

FIG. 2 is an enlarged plan view of the motor shown in FIG. 1, certain parts being shown as broken away, removed, or in section for the sake of clarity in the drawings;

FIG. 3 is a sectional view taken along the line 3—3 in FIG. 2;

FIG. 4 is a side elevational view of the FIG. 2 motor, the view being taken generally along the line 4—4 in FIG. 2;

FIG. 5 is another side elevational view taken along line 5—5 in FIG. 2 and showing the shiftable plate means in the position withdrawn from between the magnets;

FIG. 6 is a schematic electrical diagram of the motor shown in FIGS. 1 to 5;

FIG. 7 is an electrical diagram of the motor shown in FIG. 6;

FIG. 8 is a development chart of the different terminals of the rotor which are connected at any one time during a revolution of the motor;

FIG. 9 is an enlarged, cross sectional view of the distributor rotor, the view being taken generally along the line 9—9 in FIG. 6;

FIGS. 10 to 14 show various types of permanent magnets which may be used with the motor shown in FIGS. 1 to 7;

ROTARY MAGNET MOTOR TYPE

Figure 21:
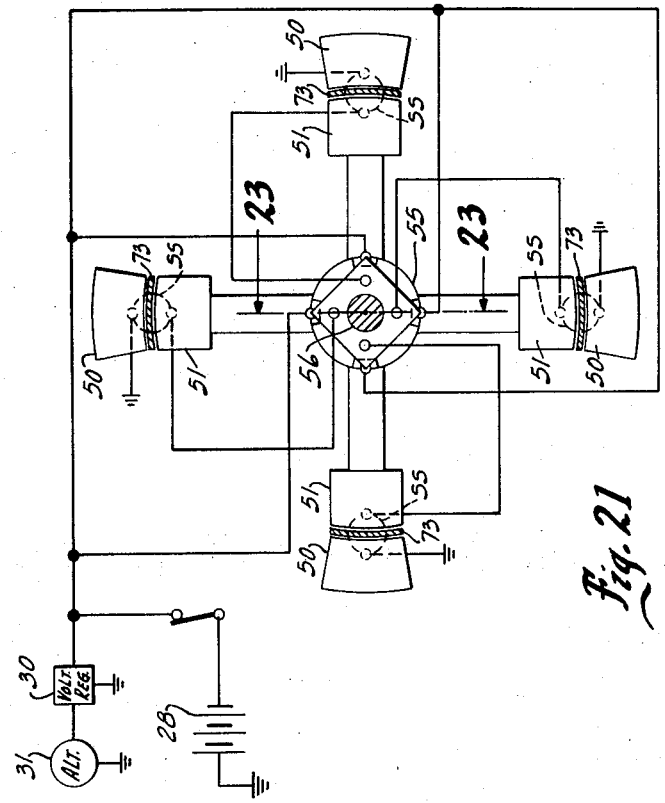
Figure 23:
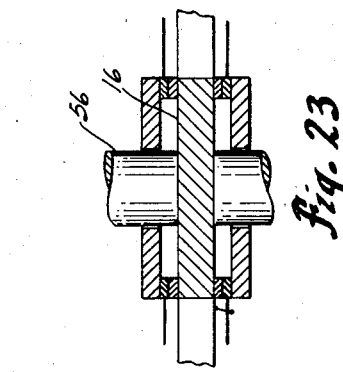
Figure 28:
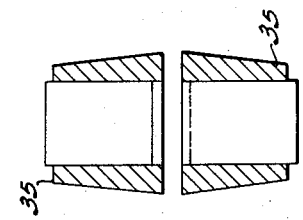
Figure 27:
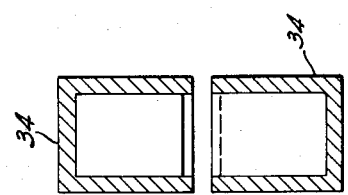
Figure 26:
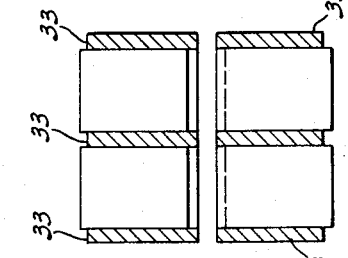
Figure 25:
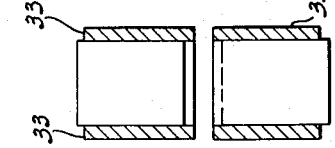
Figure 24:
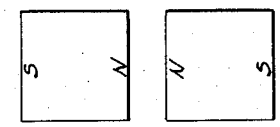

FIG. 15 is an elevational view of a permanent magnet motor of the rotary type made in accordance with the present invention, certain parts being shown as broken away, in section, or removed for the sake of clarity in the drawing;

FIG. 16 is a sectional view taken generally along the line 16—16 in FIG. 15;

FIG. 17 is an elevational view taken generally along the line 17—17 in FIG. 16, certain parts being shown in cross section or removed for the sake of clarity;

FIG. 18 is a sectional view of a portion of the device as shown in FIG. 16;

FIG. 19 is a view of the inner end of the shiftable plate means, the view being taken generally along the line 19—19 in FIG. 18;

FIG. 20 is a view similar to FIG. 18 and in addition showing the anti-friction means for slideably mounting the shiftable plate means;

FIG. 21 is an electrical diagram of the motor shown in FIGS. 15 to 17;

FIG. 22 is another electrical diagram of the motor shown in FIG. 15 to 17, but showing the rotor moved to a different position from that in FIG. 21;

FIG. 23 is a cross sectional view of the rotor taken generally along the line 23—23 in FIG. 21; and FIGS. 24 to 28 are various forms of permanent magnets usable with the motor of FIGS. 15 to 17.

DESCRIPTION OF A PREFERRED EMBODIMENT

The invention will first be described in connection with FIGS. 1 to 14 wherein a dynamo-electro motor is shown of the reciprocating magnet type.

Any number of pairs of permanent magnets may be employed but for the sake of illustration four pairs of magnets have been shown in FIGS. 1 to 14. The pairs of magnets include a stationary magnet 1 which is fixedly mounted on the frame F of the motor. The other magnet 2 of each of the pairs of magnets is reciprocable toward and away from its companion magnet 1 and for this purpose a guideway 3 is provided in which the magnet 2 can reciprocate. The inner end of the reciprocable magnets 2 is connected by a crankarm 5 to a common crankshaft 6 having an eccentric or crank portion 7.

Each of the magnets 1 and 2 of the pairs of magnets are arranged so that their like poles are adjacent to one another, that is to say, so that the permanent magnets of each pair repel one another when there is no intervening piece of metal between the magnets 1 and 2. The magnets are of such strength that they repel each other with considerable force.

Shiftable plate means of a magnetic material such as steel are adapted to be shifted in between the magnets 1 and 2 of each pair of magnets and also be withdrawn therefrom. This shiftable plate means takes the form of a sheet of steel 10 which is pivoted to the frame F as at 11 (FIG. 5) and an electric solenoid S is connected to a slotted connection 12 at one end of the steel plate 10. As shown in FIG. 5, when the solenoid is energized, it acts to pivot the plate upwardly to a position from between the magnets 1 and 2. When the plate is in this withdrawn position, the magnets repel one another. When the solenoid is not energized, the plates 10 are again returned to their position between the magnets 1 and 2, such as under the influence of a spring 14, thereby changing the flux pattern between the magnets 1 and 2 and causing the magnets to forcefully move toward one another.

The solenoids are actuated in timed relationship to one another by means of the distributor rotor 16 which comprises two rotor portions 16a and 16b which rotate as a unit on its center shaft 17 so that it engages the rotor contacts 21, 22, 23, 24, as shown in FIGS. 6 and 7 and the development chart, FIG. 8. For example, rotor 16a is shown as engaging contact 24 at the same time that rotor 16b engages contact 21.

As further shown in FIGS. 6 and 7, a source of power, such as a battery 28 provides the electrical current to the various contacts 21 to 24 inclusive and the contacts are also connected to their respective solenoids. A voltage regulator 30 and an alternator 31 are also provided so that while the motor is running, the electric energy is provided by the alternator, thus saving the power output of the battery 28. Each of the solenoids are also grounded as indicated.

By means of the above structure, the permanent magnets are operated in timed relationship with one another, and act to alternately repel or attract each other, depending on whether, respectively, the shiftable plate 10 is located out from between the magnets 1 and 2 or is located directly between the magnets 1 and 2.

As shown in FIG. 7, contacts 24 and 21 are both engaged by the rotor 16 thereby energizing their respective solenoids. The rotor is rotating in the direction indicated by the curvilinear arrows in FIGS. 6 and 7 and thus contact 24 is about to be opened which will cause its solenoid to be de-energized, thereby permitting its plate 10 to again shift between the magnets 1 and 2. This will cause those particular magnets 1 and 2 to then be forcefully attracted to one another.

It will also be noted in FIG. 7 that because the rotor 16 has closed contact 21, its solenoid is also energized and will continue to be energized after contact 24 is opened. This causes its solenoid to be energized and consequently its plate 10 to be held from between its magnets 1 and 2, thereby causing these magnets to be in the repel state. At the same time, it will be noted that the other two contacts 22 and 23 are open causing their respective solenoids to be energized, and consequently their respective plates 10 to be located between their respective magnets 1 and 2, thereby causing the magnets to be in an attract state.

As a result, all of the pairs of magnets are caused to alternately, and in succession, impart a driving force to the common crankshaft 6.

Referring now to FIGS. 10 to 14, various forms of magnets are shown, the form shown in FIG. 10 being simple permanent magnets being arranged with their like poles adjacent one another and as shown in FIGS. 1 and 6. The magnets shown in FIG. 11 are of the ceramic type having steel sides 33 which increase their power.

The magnets shown in FIG. 12 are similar to those shown in FIG. 11, but are arranged in duplicate for additional power.

The magnets shown in FIG. 13 are of the ceramic and Alnico type having a generally U-shaped casing 34, such as are made by Indiana General Company of Cudahy, Wisconsin.

The magnets shown in FIG. 14 are of the Indox type having tapered steel sides 35 which provide extremely good power, such as are made by Indiana General Company of Cudahy, Wisconsin.

ROTARY MAGNET MOTOR — FIGS. 15 THROUGH 27

This rotary type motor also employs pairs of permanent magnets, the magnets 50 of each pair being of the stationary type while their companion magnets 51 are each attached to a common rotor 55 that is fixed to the shaft 56. Shaft 56 is rotatably journalled in anti-friction bearings 57 in the frame of the motor which includes a pair of parallel, non-magnetic circular plate-like members 61 and 62. Thus the rotor 55 and its magnets 51 are rotatably guided between the plates 61 and 62.

It will be noted that the plates have a curved slot 70 extending therethrough, one slot being provided for each pair of permanent magnets 50, 51. A shiftable magnetic member, such as a sheet of steel 73, is also of a curved shape so as to complement the curved slots 70 and be slideable therein. These plates 73 are shifted by means of the electrically operated solenoids SS, being attached thereto at one end by the stub shaft 74. Thus the solenoids when energized (FIG. 18) act to withdraw the plate 73 from the slot 70 and from between the magnets 50 and 51. Thus the magnets 50, 51 which have their like poles adjacent one another are then in a repel state. When the solenoids are energized they act to shift the plate 73 to a position between the magnets 50, 51, thereby causing the magnets to be in an attract state.

In this rotary motor embodiment, all of the solenoids are energized at the same time, thereby causing their respective plates 73 to be all withdrawn from their magnets at the same time. The solenoids are also adapted to be all de-energized at the same time, thereby causing their respective plates 73 to be simultaneously inserted between their respective magnets 50, 51. Thus, in the rotary magnet motor arrangement, all of the pairs of magnets act simultaneously to apply a driving force to the common shaft 56.

The electrical diagram for the rotary magnet type motor is shown in FIGS. 21 and 22. FIG. 21 shows a schematic arrangement wherein all of the pairs of magnets 50, 51 are in he attract state due to the fact that the plates 73 are interposed between the magnets 50, 51, that is their solenoids are energized.

As shown in FIG. 22, the solenoids have all been energized to withdraw their plates 73 from between their magnets 50, 51 and the magnets 51 are shown in a moved position in between stationary magnets 50. When the magnets 51 are thus in the position shown in FIG. 22, the solenoids are about to be energized, thereby causing the plates 73 to be shifted to the position shown in FIG. 21 which will cause an attraction between each magnet 51 and its particular magnet 50 which it is approaching as the rotor turns in the direction indicated by the curvilinear arrow in FIG. 22.

In this manner, all of the pairs of magnets are simultaneously used to apply a driving force to the crank shaft 56. As soon as the magnets 51 are in full attract engagement with their corresponding magnets 50, the solenoids are again actuated to withdraw their plates 73, thereby again causing a repel state and continuous smooth movement of the magnets 51 in their rotary path.

As shown in FIG. 19, the innermost ends of the plates 73 are inclined as at 73a so that proper leading edges of the magnets begin to attract before the remainder of the magnets are in full contact with one another and this insures proper and continued application of magnetic flux lines in the correct driving relationship.

As shown in FIG. 20, anti-friction rollers 80 may be mounted on the stationary frame part 81 of the motor and the plates 73 can ride on and be guided by rollers 80, thereby making the plates easier to shift in either direction.

Referring to FIGS. 24 to 28, these magnets correspond, respectively to the magnets shown in FIGS. 10 to 13, the only difference being that their adjacent surfaces are curved to complement one another and thereby accommodate the rotary movement between the stationary and rotating magnets.

RESUME

By means of the present invention a plurality of permanent magnets are provided, the magnets of each pair being arranged with their like poles adjacent one another. This arrangement normally places the pairs of magnets in a repulse state. The shiftable magnetic plate means acts to change the magnetic field between the magnets so that the repulse state of the pairs of magnets results in an attract state. The shifting of the various plate means are timed so that the pairs of magnets act in cooperation on a common drive shaft to impart a force thereto. The only source of electrical power required is a battery which actuates the solenoids and the battery is only necessary in the start-up operation; otherwise the alternator provides the electrical energy for the solenoids.

It will be appreciated that in the use of permanent magnets, a very powerful attract or repulse force can be obtained between the magnets, while only a very slight force is necessary to slide or withdraw the magnetic plate means from or in between the magnets of each pair.

Thus a quiet, pollution free and efficient dynamo-electric permanent magnetic motor has been provided.

We claim:

1. A dynamo-electro, permanent magnet motor comprising pairs of permanent magnets, one magnet of each pair being stationary and the other magnet of each pair being shiftable relative thereto, the magnets of each pair being arranged with their like poles adjacent one another to thereby normally place them in a repulse state, shiftable magnetic plate means, and means for shifting said plate means from a position withdrawn from between the magnets of each pair to a position directly between the magnets of each pair thereby, respectively, causing the magnets of each pair to repulse each other and then move toward each other, means connecting the shiftable magnets of each pair to a common drive shaft.

2. The motor set forth in claim 1 further characterized in that said means for shifting said plate means comprises electrical solenoid means attached to said plate means, and a distributor rotor for alternately energizing and deenergizing said solenoid means whereby said plate means are shifted in timed relationship with one another.

3. The motor set forth in claim 1 further characterized in that anti-friction means are provided for shifting and guiding said plate means in their shifting movement.

4. The motor set forth in claim 1 wherein said shiftable magnets are movable in a reciprocating movement, and crankshafts connect each of said shiftable magnets to a common drive shaft.

5. The motor set forth in claim 1 further characterized in that said shiftable magnets are all connected to a common rotor for rotary movement together as a unit.

6. The motor set forth in claim 4 further characterized in that said magnets of each pair are of a complementary curved shape, and said plate means are also curved to complement the curved shape of the magnets of each pair of magnets.

* * * * *

UNITED STATES PATENT OFFICE
CERTIFICATE OF CORRECTION

Patent No. 3,703,653            Dated November 21, 1972

Inventor(s) Robert D. Tracy and David J. Derouin

It is certified that error appears in the above-identified patent and that said Letters Patent are hereby corrected as shown below:

Cancel "RECIPROCATING" from the title.

Signed and sealed this 12th day of June 1973.

(SEAL)
Attest:

EDWARD M. FLETCHER, JR.          ROBERT GOTTSCHALK
Attesting Officer                 Commissioner of Patents